United States Patent [19]
Bernhardt et al.

[11] Patent Number: 5,667,363
[45] Date of Patent: Sep. 16, 1997

[54] MAGNETICALLY SUPPORTED FRICTION PUMP

[75] Inventors: Helmut Bernhardt, Wetzlar; René Larsonneur, Wallisellen, both of Germany

[73] Assignee: Balzers-Pfeiffer, GmbH, Ablar, Germany

[21] Appl. No.: 464,490

[22] Filed: Jun. 5, 1995

[30] Foreign Application Priority Data

Aug. 1, 1994 [DE] Germany .................... 44 27 154.9

[51] Int. Cl.$^6$ .................... F04B 49/06; F04B 17/00
[52] U.S. Cl. .................... 417/44.1; 417/423.4; 415/90; 310/90.5
[58] Field of Search .................... 417/44.1, 45, 53, 417/423.12, 423.4, 229, 354, 365; 415/90, 14, 229, 170.1, 199.5; 310/90.5

[56] References Cited

U.S. PATENT DOCUMENTS

| | | | |
|---|---|---|---|
| 4,023,920 | 5/1977 | Bachler et al. | 417/354 |
| 4,082,376 | 4/1978 | Wehde et al. | 308/10 |
| 4,502,832 | 3/1985 | Becker | 415/10 |
| 4,674,952 | 6/1987 | Osterstrom | 415/170 R |
| 4,717,315 | 1/1988 | Miki et al. | |
| 4,763,032 | 8/1988 | Bramm et al. | 310/90.5 |
| 4,767,265 | 8/1988 | Osterstom | 415/170 R |
| 4,806,075 | 2/1989 | Osterstrom et al. | 415/170 R |
| 4,826,394 | 5/1989 | Lotz | 415/72 |
| 5,166,566 | 11/1992 | Bernhardt et al. | 417/423.4 |
| 5,209,631 | 5/1993 | Bernhardt | 415/90 |

FOREIGN PATENT DOCUMENTS

| | | |
|---|---|---|
| 0414127 | 2/1991 | European Pat. Off. . |
| 3120691 | 12/1982 | Germany . |
| 3150122 | 6/1983 | Germany . |
| 3818556 | 12/1989 | Germany . |
| 4114566 | 1/1993 | Germany . |
| 4232869 | 4/1993 | Germany . |
| 4227015 | 2/1994 | Germany . |
| 4227663 | 2/1994 | Germany . |
| 2035622 | 6/1980 | United Kingdom . |
| 2109596 | 6/1983 | United Kingdom . |

OTHER PUBLICATIONS

B. Shafai et al., "Magnetic Bearing Control Systems and adaptive Forced Balancing", IEEE Control Systems, Apr. 1994, pp. 4 to 12.

M. H. Ablanian "Construction and Characteristics of Turbomolecular High Vacuum Pumps", Vakuum in der Praxis 1994, No. 1, pp. 20 to 26.

Abstract of Japanese Patent Application No. 4–95156, Feb. 15 1994 vol. 18/No. 90.

*Primary Examiner*—Timothy Thorpe
*Assistant Examiner*—Xuan M. Thai
*Attorney, Agent, or Firm*—Anderson Kill & Olick P.C.

[57] ABSTRACT

A friction pump, which is equipped with at least one actively controlled magnetic radial bearing, wherein, in order to satisfy the extreme requirements necessary through the tight tolerances of pump elements and an emergency bearing, the high rotational speed and the magnetic support, a special control arrangement for the cooperation of rotor, positional sensors and the magnetic bearing control loop so that a safe operation of the pump at extreme requirements is assured in a simple manner without the use of any additional constructional elements.

4 Claims, 2 Drawing Sheets

MAGNETICALLY SUPPORTED FRICTION PUMP

FIELD OF THE INVENTION

The present invention pertains to a magnetically supported friction pump, and in particular, to a friction pump with one or several pump stages for the conveyance of gases.

BACKGROUND OF THE INVENTION

Friction pumps produce, in the range of molecular flow, a constant pressure ratio and, in the range of laminar flow, a constant pressure difference. In friction pumps of the Gaede, Holweck or Siegbahn, construction type, for instance the pressure ratio in the molecular range as well as the pressure difference in the laminar range are especially high at very narrow gaps. Turbomolecular pumps, being a refinement of friction pumps of the earlier type of construction, produce a very high pressure ratio in the molecular range even at larger gaps. In the laminar range, however, they produce only a very small pressure difference.

A friction pump constructed according to Holweck is, for instance, described in *Comptes rendus Acad. Science* 177 (1923) 43 and following. A friction pump of the type built by Siegbahn is described in the *Archives of Mathematics and Astrology and Physics* 30 B (1943). The basic construction and the mode of operation of a turbomolecular pump according to Becker are described in *Vacuum Technology* 9/10 (1966).

The operational range of turbomolecular pumps is limited towards higher pressures, since they are only fully effective in the molecular flow region. This molecular flow region is bounded by that pressure, for which the average free travel length of the molecules comes down to the order of magnitude of the vessel dimensions. Therefore, turbomolecular pumps operation only in combination with pre- or fore-vacuum pumps, generally two stage rotary vane is now pumps. If, however, it can be achieved to extend the operating range of turbomolecular pumps towards higher pressures, the effort to produce the necessary fore-vacuum can be reduced. In that case, for instance, single stage rotary vane pumps, and after would be sufficient, or, the oil tight rotary vane pumps could be replaced by dry diaphragm type pumps.

It is possible to extend the working range of a turbomolecular pump towards higher pressures by placing a friction pump of the Holweck or Siegbahn construction type downstream on the pre-vacuum stage. Such combinations are described, for instance, in the DE-AS 24 09 857 and in the EP 01 29 709.

For the operation of such frictional pumps, it is essential that the spacing between rotor and stator is very small. Only then they still operate in the molecular flow range even at higher pressures than a conventional turbomolecular pump and they develop their entire pressure ratio. Thus, the working range is extended towards higher pressures.

A high rotational speed of the rotor is another premise for an effective mode of operation of a friction pump. Herein, the rotor bearing type support has great importance. Apart from the classical mechanical rotor support by lubricated ball bearings, combinations of permanent-magnetic bearings and ball bearings are used today.

For completely contact-free support or operation, actively controlled magnetic bearings of various types can be used. These require, however, in addition to the magnetic bearing elements, a mechanical emergency bearing arrangement. If a magnetic bearing or parts thereof fail during operation, the emergency bearings have the task to support the rotor. This can occur in the course of a short malfunction, after which the rotor is again being levitated by the magnetic bearings, or also after a longer malfunction, wherein, the rotor is carried by the emergency bearings until the coasting stage is reached. In both cases, the emergency bearings must be designed, in such a way that a safe rotor operation is assured without contact with the very closely adjacent stator disks.

It follows herefrom that the gaps between rotor and emergency bearings must be significantly smaller than the anyway very narrow gaps in the region of the pump elements. At higher rotational speeds, an unbalance (technical term) leads to movements of the rotor which furthermore limit the clearance in the emergency bearing.

It is advantageous to utilize control methods which result in an operation of the rotor without any forces acting upon it. Herein, the movements of the rotor caused by unbalance are not controlled in order to avoid transmitting the corresponding reaction forces to the housing. During operation, the rotor unbalance can, however, increase due to different reasons, which also increases the amplitude of the rotor movement. This can only be tolerated in a very limited range so that no contact with the stator parts can occur.

These extreme requirements, high rotational speed, minimum gaps between the stationary and rotating parts of the pump elements and the emergency bearings as well as the necessity of a safe operation, also in case of a malfunction of the magnetic bearing, build up conditions for the designer of such a frictional pump, which can only be made compatible with the greatest difficulties.

It is possible to approach a solution of these problems by a high accuracy machining. This means, however, a large expenditure of work and technical equipment. Sensor technology also provides solutions, which, as well, are characterized by a effort in work technology and financial expense.

SUMMARY OF THE INVENTION

It is the object of the present invention to propose a friction pump whose rotor is supported by actively controlled magnetic bearings, wherein the problems and shortenings of the prior art, which are enumerated above, are solved in a simple manner, so that a safe operation with extreme requirements is assured for the pump. In particular, it is to be achieved that the rotor motion, which is characterized by rotation of the rotor around its principal axis of inertia without any forces acting on it at small unbalances, is limited in its amplitude even at larger unbalances.

The present invention provides a friction pump with one or several pump stages for the conveyance of gases, wherein the support of the rotor is achieved by magnetic bearings with at least one actively controlled radial bearing. The radial position of the rotor relative to the housing or the stator arrangements is obtained or determined by position sensors. At least one mechanical emergency bearing exists, characterized in that the magnetic radial bearing, the position sensors and the controller arrangement for the magnetic bearing cooperate in such a way, that the geometric center of the rotor in the emergency bearing can be determined and the rotor can be centered in that position.

In order to control shaking which, for instance, can arise due to external effects upon the pump, the position of the rotor is continuously monitored by a control device and, if necessary, corrected by changing the currents in the active radial bearing. In order to determine the rotor position, sensors based on different principles or auxiliary methods, which determine the rotor position from other control circuit signals, can be used. In case of such shaking or shocks, the rotor is unavoidably deviated for a short time from its nominal position, in order to be subsequently returned to that position by the control device. This means that a specific spacing between rotor and emergency bearing must exist if contact between these two elements is to be prevented. Since shock can come from any random direction, this spacing is required also in any random direction.

In simple words, it can be noted that the resistance to shock of such a pump for a given overall emergency bearing air gap is the higher, the more accurately the rotor is positioned in the geometrical center of the emergency bearing.

The great advantage of the invention lies in that no additional construction elements are necessary for determining the center of the emergency bearing and for centering the rotor in this position. The constructional elements such as sensors and controllers already existing for the magnetic bearing are used for the adjustment thereof. In addition, highly accurate mechanical machining exceeding the above technology and/or expensive sensor technology, as for instance linear or linearized sensors, are not necessary.

At a high rotational speed, it is important that the geometrical position of the rotor is maintained independently from unavoidable unbalances. Control devices for magnetic bearings of the conventional type as they are used for positioning the rotor in a predetermined attitude or position, do not solve this problem or solve it only incompletely. The arrangements described and illustrated hereinbelow assure a secure operation of the rotor of a friction pump also in the unbalanced state. If the unbalance, and thus, the amplitude of the rotor motion exceeds a predetermined magnitude, one changes from a control which provides force-free rotation to an amplitude-limited control as described and illustrated hereinbelow.

Accordingly, it is an object of the present invention to provide a friction pump whose rotor is supported on actively controlled magnetic bearings, wherein the problems enumerated above are solved in a simple manner, so that a safe operation at extreme requirements is assured for the pump.

It is another object of the present invention to provide a friction pump wherein rotor motion, which is characterized by rotation of the rotor around its principal axis of inertia without any forces acting on it at small unbalances, is limited in its amplitude at larger unbalances.

It is still another object of the present invention to provide a friction pump wherein no additional construction elements are necessary for determining the center of the emergency bearings and for centering the rotor in this position.

It is still another object of the present invention to provide a friction pump wherein the constructional elements such as sensors and controllers already existing for the magnetic bearing are used for the adjustment thereof.

It is still another object of the present invention to provide a friction pump wherein highly accurate mechanical machining is not necessary.

Other objects and advantages of the present invention will be apparent to those skilled in the art upon a review of the Description of the Preferred Embodiment taken in conjunction with the Drawings which follow.

DESCRIPTION OF THE PREFERRED EMBODIMENT

Figure 1:
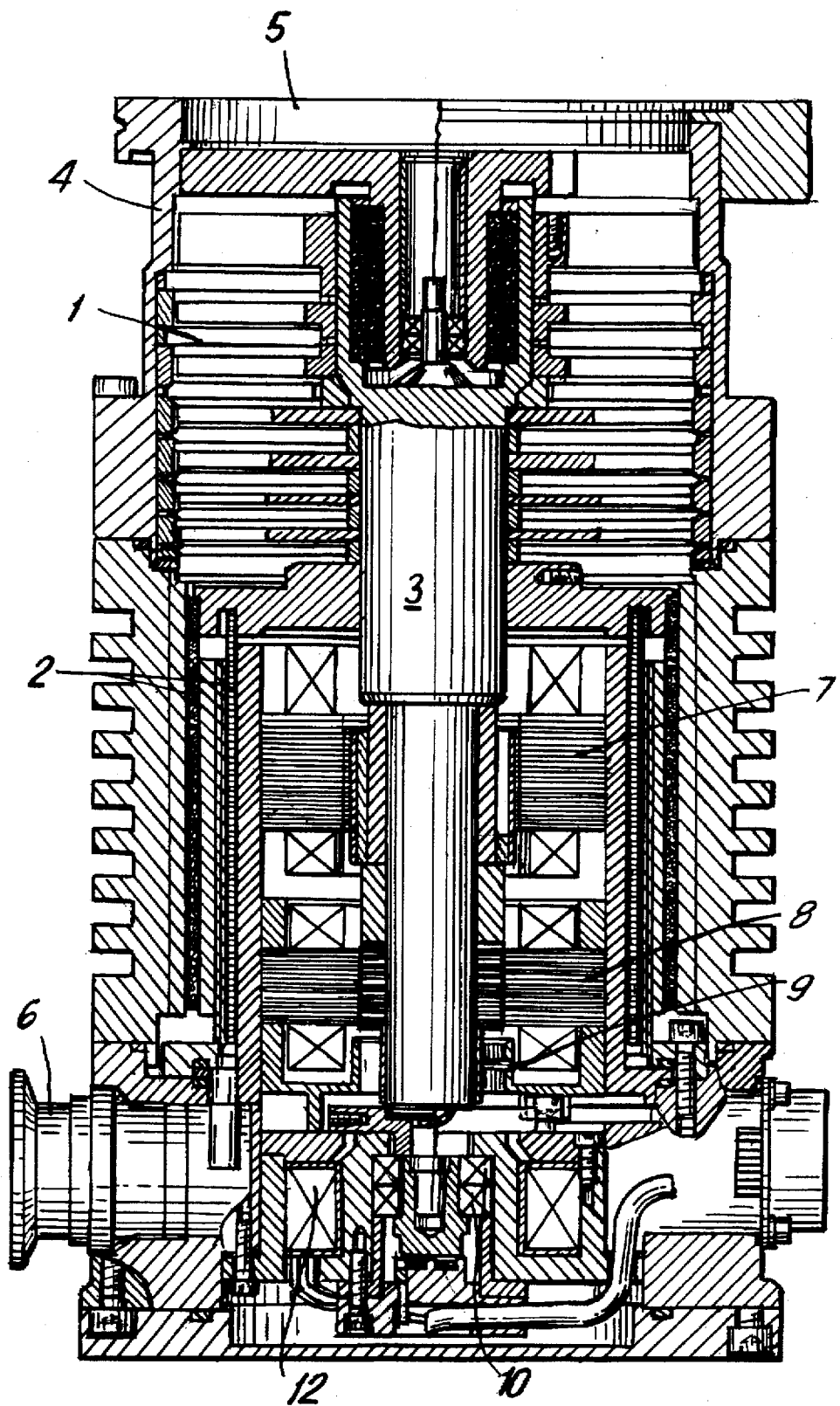
FIG. 1 illustrates a schematic drawing of a friction pump with a turbomolecular pump stage, a Holweck stage and a magnetic bearing.

The friction pump illustrated in FIG. 1 consists of a turbomolecular pump 1 as a high- or deep-vacuum stage and a molecular pump 2 according to the construction of Holweck as a pump stage for the higher pressure range. Both pump stages are mounted in a common housing 4 having a suction flange 5 and a vacuum connection 6. The drive of the common rotor 3 is designated by the numeral 7. An actively controlled magnetic radial bearing 8 is fastened beneath the driving device 7 in the present example. The numeral 9 designates a radial position sensor. Another sensor is located with an angular offset of 90° and is not shown. A mechanical emergency bearing is designated by the numeral 10. In the example shown, it should be noted that the top portion of the rotor is provided with a passive radial permanent magnetic bearing 11 and that the axial position is stabilized by an active thrust bearing 12 at the bottom end of the rotor.

Figure 2:
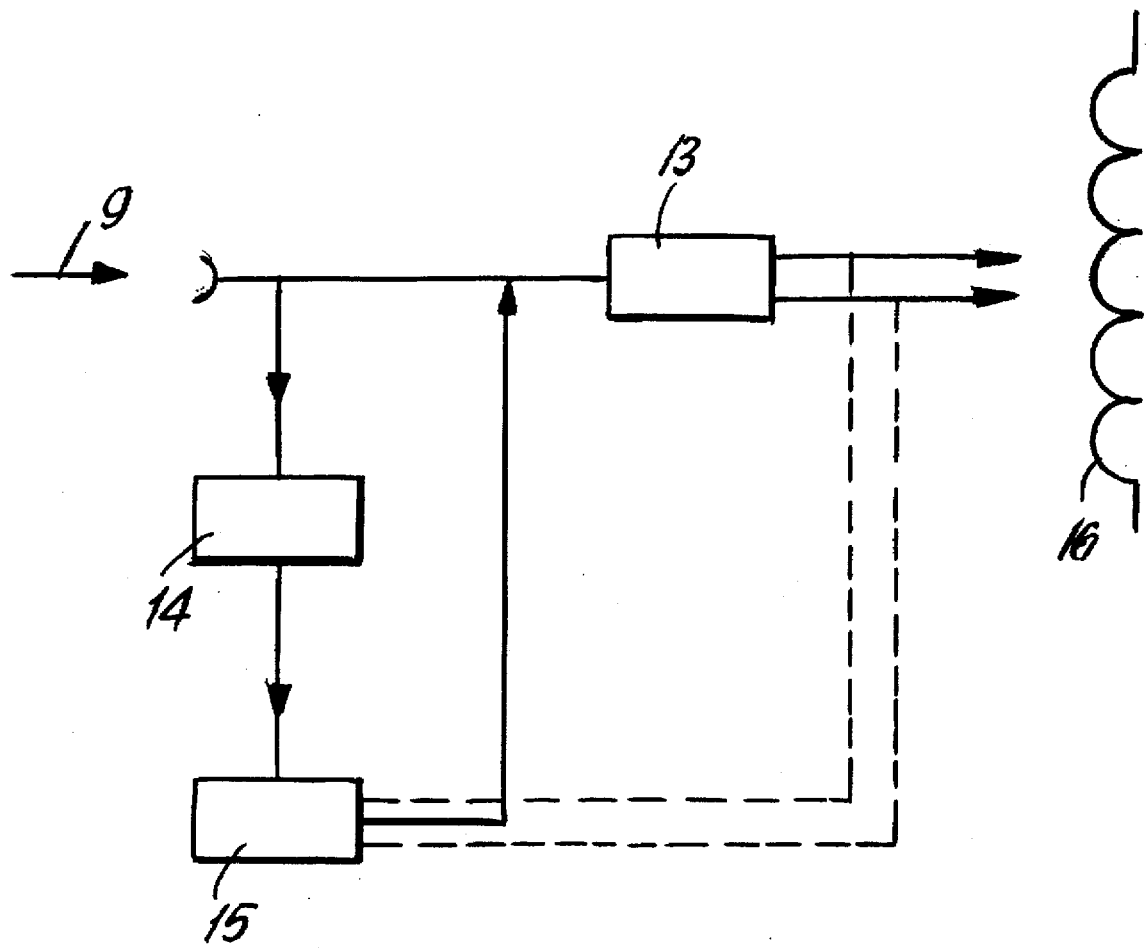
FIG. 2 illustrates a block diagram of the control loop of the magnetic bearing.

FIG. 2 illustrates an overview of the control loop or control arrangement. The signal issuing from the sensor 9 is processed in the controller 13 which has recognized or acquired the geometric center of the rotor. The controller 13 then issues an actuation signal to the coils 16 of the magnetic bearing, which positions the rotor in the center. In the unbalance recognition unit 14, the rotational frequency components caused by the unbalance are recognized or acquired in the sensor signals according to amplitude and phase and passed on to the computation unit 15. Its output signals are fed to the original sensor signals as a correction value. As an alternative, the signals appropriately processed by the computation unit 15 can also be directed to the output of the computer 13 in order to directly correct the actuation signal for the coils 16 of the electromagnets.

If the controller 13 is realized with a digital microprocessor, said microprocessor can also assume the functions of the unbalance recognition unit 14 and the computation unit 15 wherein no additional hardware is required.

While the present invention has been described and illustrated in a preferred embodiment, such is merely illustrative of the present invention and is not to be construed to be a limitation thereof. Accordingly, the scope of the present invention is to be limited only by the claims which follow.

What is claimed is:

1. A friction pump, comprising:

a housing;

at least one pumping stage for conveying gases, located in said housing and including:

a rotor;

a stator surrounding the rotor, magnetic means for supporting the rotor and comprising at least one actively controlled magnetic radial bearing for supporting the rotor in a predetermined radial position relative to one of the housing and the stator, and a mechanical emergency bearing for supporting the rotor in case of failure of the magnetic means; and means for determining a geometrical center of the mechanical emergency bearing and for retaining the rotor in the geometrical center of the emergency bearing, the determining and retaining means comprising:

means for consecutively displacing the rotor in two mutually perpendicular directions against the emergency bearing;

radial sensor means for sensing a position of the rotor obtained by displacement of the rotor and for generating a position signal, and control means for computing the geometrical center of the emergency bearing and for controlling the magnetic radial bearing so that the predetermined radial position of the rotor corresponds to a position of the rotor in the geometrical center of the emergency bearing.

2. A friction pump according to claim 1, further comprising an unbalance recognition unit, a computation unit, first conductor means for connecting an input of the unbalance recognition means with an output of the radial sensor means, and second conductor means for connecting an output of the unbalance recognition unit with the computation unit;

wherein the magnetic radial bearing comprises a coil a current flow through which controls the magnetic radial bearing so that the rotor is supported in the predetermined position, and wherein there is provided third conductor means for connecting an output of the computation unit with one of input and output of the control means for controlling the current flow through the coil of the magnetic radial bearing in accordance with a correction magnitude obtained by changing of an amplitude and a phase of a rotational speed component of the position signal generated by the radial sensor means and filtered by the unbalance recognition unit.

3. A friction pump according to claim 1, further comprising a computation unit for effecting running of the rotor free of influence of forces produced by a rotor rotational speed component as long as a rotor amplitude does not exceed a predetermined magnitude and for limiting the rotor amplitude in case the rotor amplitude exceeds the predetermined magnitude.

4. A friction pump according to claim 1, further comprising a computation unit for effecting running of the rotor free of influence of forces produced by a rotor rotational speed component as long as a rotor amplitude does not exceed a predetermined magnitude, for limiting the rotor amplitude in case the rotor amplitude exceeds the predetermined magnitude, and for providing a continuous transition from a force influence-free operation of the rotor to an amplitude-limiting operation as a function of an amplitude of rotor rotation.

* * * * *